United States Patent [19]

Shioiri et al.

[11] Patent Number: 4,556,478
[45] Date of Patent: Dec. 3, 1985

[54] HYDROCARBON CONVERSION PROCESS AND CATALYST COMPOSITION

[75] Inventors: Tomonori Shioiri, Yokohama; Takashi Ino, Kawasaki, both of Japan

[73] Assignee: Research Association for Residual Oil Processing, Tokyo, Japan

[21] Appl. No.: 712,033

[22] Filed: Mar. 15, 1985

Related U.S. Application Data

[62] Division of Ser. No. 578,104, Feb. 8, 1984, Pat. No. 4,515,902.

[30] Foreign Application Priority Data

Feb. 16, 1983 [JP] Japan .................................. 58-22901

[51] Int. Cl.⁴ ............................................. C10G 11/05
[52] U.S. Cl. .................................... 208/120; 208/111; 208/251 H; 585/467; 585/475; 585/533; 585/739
[58] Field of Search ........................................ 208/120

[56] References Cited

U.S. PATENT DOCUMENTS

| | | | |
|---|---|---|---|
| 3,436,357 | 4/1969 | Plank et al. | 502/65 |
| 3,507,778 | 4/1970 | Gladrow et al. | 208/111 |
| 3,951,864 | 4/1976 | Meyer | 502/66 |
| 4,222,896 | 9/1980 | Swift | 502/65 |
| 4,259,212 | 3/1981 | Gladrow et al. | 208/120 X |
| 4,300,997 | 11/1981 | Meguerian et al. | 208/120 |
| 4,369,108 | 1/1983 | Bertolacini et al. | 208/122 X |
| 4,399,026 | 8/1983 | Shiroto et al. | 208/110 |
| 4,459,371 | 7/1984 | Hobbs et al. | 502/341 |
| 4,465,588 | 8/1984 | Occelli et al. | 208/120 |
| 4,466,884 | 8/1984 | Occelli et al. | 208/120 |
| 4,469,589 | 9/1984 | Yoo et al. | 208/113 |
| 4,471,070 | 9/1984 | Siefert et al. | 502/341 X |

Primary Examiner—D. E. Gantz
Assistant Examiner—O. Chaudhuri
Attorney, Agent, or Firm—Stevens, Davis, Miller & Mosher

[57] ABSTRACT

Hydrocarbon conversion with a catalyst comprising 3 to 40 weight percent of a crystalline aluminosilicate zeolite and 60 to 97 weight percent of an alumina-magnesia matrix having a magnesia content of 2 to 50 weight percent.

2 Claims, No Drawings

HYDROCARBON CONVERSION PROCESS AND CATALYST COMPOSITION

This is a division of application Ser. No. 578,104, filed Feb. 8, 1984, now U.S. Pat. No. 4,515,902.

BACKGROUND OF THE INVENTION

The present invention relates to a hydrocarbon conversion catalyst and a process for preparing the same. More particularly, it is concerned with a novel hydrocarbon conversion catalyst which exhibits an outstanding effect as a catalytic cracking catalyst for heavy oil containing not less than 0.5 ppm of heavy metals such as, for example, nickel, vanadium and iron, as well as a process for preparing the same.

In the ordinary catalytic cracking process, petroleum hydrocarbons are cracked by contacting with a catalyst to obtain large amounts of light fractions such as liquefied petroleum gas (LPG) and gasoline and small amounts of cracked gas oil, etc., and the catalyst is recycled and reused after removal of coke deposited thereon by burning with air. In such catalytic cracking process, so-called distillates such as, for example, light gas oil (LGO) and heavy gas oil (HGO) obtained from an atmospheric distillation column and vacuum gas oil (VGO) from a vacuum distillation column have heretofore been mainly used as starting oils.

Recently, however, crude oils supplied in the world have become heavier according to classification based on the boiling range, and the structure of the demand for crude oils has changed, and such supply and demand conditions are giving rise to a tendency to excess supply of heavy oils. Consequently, it is now required to use even heavy oils containing distillation residue as starting oils for catalytic cracking.

However, in heavy oils containing distillation residue there are contained metals such as nickel, vanadium, iron, copper and sodium in much larger amounts than in distillates. It is known that these metals are deposited on a catalyst and impede the cracking activity and selectivity severely. More particularly, as the metals are deposited on the catalyst, the cracking percentage lowers to the extent that a desirable cracking percentage is substantially not attainable, while the amount of hydrogen and that of coke produced are remarkably increased, thus making the operation of the apparatus difficult, and at the same time the yield of desirable liquid products decreases.

Generally, catalysts available as catalytic cracking catalysts for heavy oils, like ordinary catalytic cracking catalysts using distillates as starting materials, comprise a combination of Y type zeolite and an amorphous silica-alumina matrix. In such conventional catalysts, however, it is necessary to reduce the surface area of the matrix in order to improve the resistance to metals, and even such reduction of the surface area is done, the catalytic performance is still unsatisfactory.

SUMMARY OF THE INVENTION

It is an object of the present invention to provide a hydrocarbon conversion catalyst, especially a catalyst suitable for the catalytic cracking of hydrocarbon oils. More specifically, an object of the invention is to provide a catalytic cracking catalyst superior in resistance to metals and capable of suppressing the amount of hydrogen and that of coke produced without decreasing the yield of gasoline and middle distillates in the cracking of h.eavy oil containing not less than 0.5 ppm of heavy metals such as, for example, nickel, vanadium and iron.

It is another object of the present invention to provide an effective manufacturing process for the above catalyst.

It is a further object of the present invention to provide a fluid catalytic cracking process for heavy oils.

Having made extensive studies for attaining the above-mentioned objects, the present inventors found that if specific proportions of a crystalline aluminosilicate zeolite and an alumina-magnesia matrix are combined in a specific content of the magnesia in the matrix, there is obtained a catalyst having a high resistance to metals and exhibiting a very superior catalytic performance, regardless of the surface area (50–300 $m^2/g$) of the matrix.

According to the present invention, there is provided a hydrocarbon conversion catalyst comprising 3 to 40 wt. % of a crystalline aluminosilicate zeolite and 60 to 97 wt. % of an alumina-magnesia matrix (the percentages being based on the total weight of the catalyst) with a magnesia content in the matrix of 2 to 50 wt. %.

PREFERRED EMBODIMENTS OF THE INVENTION

The alumina-magnesia matrix in the catalyst of the present invention is a synthetic product or a product obtained by treating a natural clay mineral, which consists mainly of alumina ($Al_2O_3$) and magnesia (MgO), with the magnesia content being 2 to 50 wt. %, preferably 4 to 30 wt. %. If the magnesia content of the matrix is less than 2 wt. %, the characteristic effects of the present invention will not be attained, and if the magnesia content is larger than 50 wt. %, it will be impossible to attain a sufficient catalytic activity.

The above matrix may be prepared by any suitable method. For example, it may be prepared in the following manner. A mixed aqueous solution of aluminum salt and magnesium salt is reacted with ammo-ia to form an alumina-magnesia hydrogel slurry. In this case, the kind of salts to be used is not specially limited, but chlorides, nitrates and sulfates are preferred. Then, the hydrogel slurry is aged and then filtered, followed by washing with a sufficient amount of pure water, drying overnight at a temperature of say, 110° C., and calcining in air at 500°–600° C. for 4 to 10 hours. The matrix thus obtained has a specific surface area of 50 to 300 $m^2/g$, a pore volume of 0.1 to 1.2 cc/g and an average pore diameter of 10 to 200 Å.

The crystalline aluminosilicate zeolite used dispersedly in the alumina-magnesia matrix is a natural or synthetic crystalline aluminosilicate, which is a porous substance having a three-dimensional framework and having a uniform pore diameter in the range of about 4 to about 15 Å. Examples of natural zeolites which may be used in the present invention are gmelinite, chabazite, dachiardite, clinoptilolite, faujasite, heulandite, analcime, levynite, erionite, sodalite, cancrinite, ferrierite, brewsterite, offretite, natrolite and mordenite, with faujasite being most preferred. Examples of synthetic zeolites are zeolite Y, A, L, ZK-4, B, E, F, HJ, M, Q, T, W, Z, Alpha, Beta, ZSM and Omega with Y and X type zeolites, or a mixture thereof, being most preferred.

It is well known that in the case of using zeolite as a catalytic cracking catalyst of high activity, it is desirable to make the content of $Na_2O$ in the zeolite as low as possible. If the $Na_2O$ content is high, not only the catalytic activity is low, but also the catalyst life is shortened because of a poor heat resistance. The sodium ion in zeolite is exchangeable with other cations, so the Na2O content of zeolite can be decreased by the ion exchange method. Preferred examples of cations are calcium, magnesium, hydrogen, rare earth elements, platinum and palladium. Hydrogen and rare earth elements are particularly suitable in the case of using zeolite as a catalytic cracking catalyst component.

The manufacturing method for the zeolites exemplified above is not specially limited. For example, the following method may be adopted. A mixture of Na-Y type zeolite, a rare earth element chloride and ammonium chloride is stirred at 60°–100° C. for 2 to 10 hours to allow ion exchange to take place. This ion-exchanging operation is repeated two to five times if required. After subsequent filtration, the zeolite is dried overnight at 80°–150° C. and then calcined in air at 400°–650° C. for 2 to 10 hours. The Na2O content of the zeolite thus obtained is in the range of 0.5 to 2.0 wt. %, but if the calcination in air is followed by ion exchange, the Na2O content will be further reduced.

In the present invention, the zeolite is mixed with the alumina-magnesia matrix so that its content is 3 to 40 wt. %, preferably 5 to 30 wt. %. A zeolite content lower than 3 wt. % is not desirable because it would lead to a deteriorated catalytic activity. If the zeolite content is higher than 40 wt. %, there will occur an over-cracking because of a too high catalytic activity, and the yield of a desired product will be lower. The zeolite and matrix mixing method is not specially limited. For example, a zeolite slurry obtained by using an aqueous or non-aqueous solvent may be mixed with the matrix under heating, followed by drying. Even a mere mechanical mixing of the zeolite and the matrix may be adopted. There also may be adopted a method in which, as in the case of conventional fluid catalytic cracking (FCC) catalysts, a gel or sol of the matrix is mixed with the zeolite slurry and the resultant mixture is spray-dried. In this case, a binder such as alumina sol or silica gel may be added.

Thus, the catalyst of the present invention can be prepared by various methods, but magnesia or magnesium hydroxide exhibits basicity in water, so in the case where the zeolite as a solid acid and magnesia or magnesium hydroxide are mixed in water, part of acid points in the zeolite may be poisoned by magnesium, thus resulting in decrease of acid points as active points in the catalytic cracking catalyst, which leads to deterioration of the catalytic activity. For preventing such a lowering of the activity' the following two methods are particularly effective.

In one method, the pH of a mixture of alumina hydrate and magnesia hydrate is adjusted to a weak alkaline side of 9 to 12 by the addition of alkali, then the mixture is aged under heating at 50°–100° C. and with stirring to form an alumina-magnesia hydrogel slurry, thereafter this hydrogel slurry is mixed with the zeolite slurry, and the mixture is dried and then calcined if desired. In this case, the alumina hydrate used as a starting material can be prepared by neutralizing an aluminate such as sodium aluminate or an aluminum salt such as aluminum sulfate according to a conventional method. Likewise, the magnesium hydrate can be obtained by neutralizing a magnesium salt in a known manner. For obtaining the alumina hydrate and the magnesium hydrate at a time, an alkali may be added to a mixed solution of the aluminum salt and magnesium salt to co precipitate an alumina-magnesia hydrogel. Although a by-product salt will be present in the neutralization product thus obtained, it may be removed beforehand from the neutralization product, or may be removed after the heat-stirring step or after drying.

Then, a suitable alkali, e.g. ammonia water, is added to the alumina hydrate - magnesia hydrate mixture to adjust the pH of this alumina-magnesia hydrogel slurry into a weak alkaline side of 9 to 12, preferably 9.5 to 11. The hydrogel slurry is then aged under heating and with stirring. The ageing time is in the range of usually 1 to 20 hours, preferably 2 to 10 hours. The ageing temperature is in the range of preferably 50° to 100° C., more preferably 80° to 100° C. An ageing temperature below 50° C. is not desirable because it would result in that the effect of the ageing with stirring is not obtained and the activity of the final catalyst is deteriorated. The stirring may be done at any rate of stirring if only the stirring gives rise to a flow of the entire slurry. But, preferably, the stirring rate is 100 to 600 rpm. If the ageing is performed without stirring, the zeolite will be poisoned by magnesium hydroxide in the step of kneading the alumina-magnesia hydrogel slurry and the zeolite slurry and the final catalyst will become less active.

The alumina-magnesia hydrogel slurry thus aged with stirring is mixed with the zeolite slurry. Then, the resultant mixture is dried. The drying may be effected by spraying drying or by drying in an oven. In this case, there may be added a binder such as alumina sol or silica sol, or a clay mineral such as kaolin or bentonite. The dried catalyst may be used as it is, but as the case may be it is used after subsequent calcination in air at 500°–600° C. for 4–10 hours.

In the other method for preventing the deterioration of the catalytic activity, a basic compound is adsorbed on the zeolite in advance, and the zeolite with the basic compound adsorbed thereon is mixed with the alumina-magnesia matrix. Preferably, the basic compound adsorbed on the zeolite is desorbed from the catalyst or burns in the later calcination in air of the catalyst and does not remain in the catalyst. Examples are organobasic compounds such as aliphatic amines (methylamine, butylamine, etc.), aromatic amines aniline, toluidine, etc. and cyclic amines (pyridine, piperidine, etc.), as well as ammonia.

The basic compound may be adsorbed on the zeolite in vapor phase or in liquid phase to the extent that the acid points in the zeolite are neutralized. In the vapor phase adsorption, the vapor of the basic compound is adsorbed on the zeolite at a temperature of 20° to 100° C. for a contact time of 5 minutes to 2 hours. On the other hand, in the liquid phase adsorption, the zeolite is immersed in a solution of the basic compound in an aqueous or non-aqueous solvent and allowed to stand at a temperature of 20° to 50° C. for a contact time of 5 minutes to 2 hours, and then the solvent is removed.

By allowing the basic compound to be adsorbed on the zeolite, the acid points in the zeolite is protected even after the mixing of the zeolite with the alumina-magnesia matrix, thus making it possible to obtain a high activity catalyst.

Then, the zeolite with the basic compound adsorbed thereon is mixed with the alumina-magnesia matrix. The mixing method is not specially limited. For example, the zeolite slurry obtained by using an aqueous or non-aqueous solvent may be mixed with the matrix under heating. The mixing may be even a mere mechanical mixing of the zeolite with the matrix. There also may be adopted a method in which the zeolite slurry may be mixed with the hydrogel slurry of the matrix after ageing, filtration and washing in the matrix manufacturing process, then the resultant mixture is spray-dried and thereafter calcined in air at 500°–600° C. for 4–10 hours. In this case, there may be added a binder such as alumina sol or silica sol.

The thus-prepared catalyst of the present invention can be used for the catalytic cracking of hydrocarbons, hydrogenolysis, alkylation, polymerization, hydrodemetallization, isomerization, disproportionation of toluene, etc. Particularly, when it is used in the fluid catalytic cracking of heavy oil containing not less than 0.5 ppm of heavy metals such as nickel and vanadium, it exhibits outstanding effects such as, for example, a not less than 50% yield of light fractions and an extremely small amount of dry gas produced.

The heavy oil referred to herein may be a heavy oil derived from one kind of crude oil or a mixture of two or more kinds of crude oils, for example, a mixture of crude oils from Southeast Asia, the Middle East, Africa, North and South America, Mexico, the North Sea, Alaska, etc. Moreover, the heavy oil referred to herein is a hydrocarbon mineral oil substantially containing asphaltene or resin (usually not less than 0.5 wt. %) and containing not less than 0.5 ppm as a total amount of nickel and vanadium. It contains residual components separated by the distilling operation in the petroleum refining process. Examples are residual oils in atmospheric and vacuum distillations, solvent deasphalted oil and asphalt, and a mixture of any of them with distillate or distillates usually boiling above 200° C. obtained from atmospheric distillation and/or vacuum distillation such as, for example, LGO (boiling in the range of 200° to 300° C.), HGO (300° to 500° C.) and/or VGO (300° to 570° C.). The contents of residual oil in this mixture is not less than 1 wt. %.

Shale oil, tar sand and coal liquefied oil are also illustrative of the heavy oil referred to herein.

If the catalyst of the present invention is used in the fluid catalytic cracking of the heavy oil, although the reason is not fully clear, the yield of hydrogen and coke usually increased by the metals deposited on the catalyst is decreased, so not only the load on a gas compressor of the distillation equipment for cracked product and that on an air blower for supplying air to burn the coke on the catalyst are diminished, but also the yield of a desirable liquid product is increased.

As a concrete method of using the novel catalyst of the present invention, the catalyst is supplied periodically in an amount necessary for maintaining in a predetermined range the amount of metals deposited on the catalyst present within a fluid catalytic cracking apparatus, and the catalyst in use is withdrawn from the apparatus in an amount corresponding to the amount consumed during the operation plus the replenished amount. The amount of replenishment depends on the amount of the heavy oil to be treated, the content of metals in the heavy oil and the allowable amount of metals deposited on the catalyst. The higher the allowable amount of metals deposited on the catalyst, the smaller can be provided. At amounts up to 2 wt. % of metals deposited on the catalyst, the amounts of hydrogen and coke are suppressed within the normal allowable range, and the amount of replenishment is reduced. Thus, the catalyst of the present invention is very economical.

The apparatus used for catalytic cracking, namely, the fluid catalytic cracking apparatus having reaction zone, separation zone, stripping zone, catalyst regeneration zone and distillation zone, is not specially limited, but it is desirable that the apparatus be suitable fo substantially cracking the heavy oil. For example, preferably the reaction zone comprises a riser reaction zone for shortening the oil-catalyst contact time to reduce the amount of coke produced, and a preferable regeneration zone is provided with equipment proof against high temperatures up to around 750° C. or a heat removing equipment. Conditions for the operation of the apparatus are not specially limited, either. As an example, the reaction temperature is in the range of 450° to 550° C., pressure 0.5 to 3 kg/cm². G, catalyst regeneration temperature 550° to 750° C., catalyst/oil ratio 3 to 20 wt/wt, contact time 0.5 to 5 sec. and CFR [(fresh starting oil+recycle oil)/fresh starting oil] 1.0 to 2.0 vol/-vol.

The light distillate referred to herein is a distillate boiling in the range of 35° to 350° C., used for gasoline and middle distillate (kerosene and gas oil). The yield of the light distillate is not less than 50%, particularly not less than 70%. It is calculated according to the following equation on the basis of substances boiling above 350° C. contained in the starting oil:

$$\text{Light distillate yield} = \frac{\text{Product (35–350° C.)}}{\text{Substances boiling above 350° C. in the starting oil}} \times 100$$

The dry gas referred to herein means hydrogen and $C_1$–$C_2$ hydrocarbons (methane, ethane and ethylene). The yield of the dry gas (scf/bbl) is usually not more than 400, preferably not more than 250.

The features of the present invention will be understood more clearly from the following examples. But it is to be noted that the invention is not limited to those examples.

EXAMPLE 1

(A) Preparation of Alumina-Magnesia Matrix 307 g. of aluminum nitrate and 53 g. of magnesium nitrate were dissolved in 1 liter of pure water and the resultant mixed solution was dropwise added to 877 cc. of 4N ammonia water with vigorous stirring over a period of about 1 hour. The resultant precipitate was recovered by filtration and washed with 2 liters of pure water. The cake thus obtained was dried overnight in an oven held at 110° C., followed by calcination in air at 500° C. for 4 hours, to obtain an alumina-magnesia matrix.

(B) Preparation of La, H-Y type Zeolite

Into a 2 liter beaker were charged 20 g. of Na-Y type zeolite, 83 g. of lanthanum chloride and 15 g. of ammonium chloride, then pure water was added to make up to 1 liter. The mixture was stirred for 3 hours by means of a magnetic stirrer under heating to about 80° C., then filtered and washed with 1 liter of pure water. After repeating this operation three times, the zeolite was dried overnight in an oven at 110° C. and subsequently calcined in air at 540° C. for 3 hours. Lastly, the above ion-exchanging operation was further performed once, followed by washing, drying and subsequent calcination at 500° C. for 2 hours. The lanthanum exchange percentage of the thus-obtained La, H-Y type zeolite was 77%, and the amount of remaining $Na_2O$ was 0.81 wt. %.

0.9 g. of the zeolite prepared in (B) was placed in a 50 cc. beaker, then 20 cc. of acetone was added. The resultant suspension was exposed to ultrasonic wave whereby the zeolite was slurried. 5.1 g. of the alumina-magnesia matrix prepared in (A) and 20 cc. of acetone were charged into a 300 cc. beaker, to which was then added the above zeolite slurry. Acetone was evaporated by heating with stirring, thereby allowing the zeolite to be dispersed and deposited on the matrix. The composition of the final product is as shown in Table 1.

The catalyst thus prepared was evaluated in accordance with ASTM (D-3907) MAT (microactivity test).

Comparative Examples 3–6

Catalysts having such different matrix compositions and matrix/zeolite ratios as shown in Table 1 were prepared and evaluated in the same way as in Example 1, results of which are as shown in Table 1. As can be seen from the table, catalysts F and G having $SiO_2.Al_2O_3$ and $SiO_2$. MgO matrices respectively afford high dry gas and coke yields and do not exhibit resistance to nickel. Catalyst H having a zeolite content lower than 3 wt. % is low in activity and cannot afford a sufficient cracking percentage. Catalyst I having a zeolite content higher than 40 wt. % is too high in activity and exhibits a low liquid yield due to over-cracking.

TABLE 1

| Catalyst | Example 1 A | Example 2 B | Example 3 C | Comparative Example 1 D | Comparative Example 2 E | Comparative Example 3 F | Comparative Example 4 G | Comparative Example 5 H | Comparative Example 6 I |
|---|---|---|---|---|---|---|---|---|---|
| Matrix Composition wt % | 85 | 85 | 85 | 85 | 85 | 85 | 85 | 98 | 50 |
| $SiO_2$ | 0 | 0 | 0 | 0 | 0 | 72.0 | 74.0 | 0 | 0 |
| $Al_2O_3$ | 95.3 | 84.5 | 71.7 | 98.8 | 24.0 | 28.0 | 0 | 84.5 | 84.5 |
| MgO | 4.7 | 16.5 | 28.3 | 1.2 | 76.0 | 0 | 26.0 | 16.5 | 16.5 |
| Zeolite Content wt % | 15 | 15 | 15 | 15 | 15 | 15 | 15 | 2 | 50 |
| Catalyst Surface Area $m^2/g$ | 307 | 292 | 236 | 307 | 213 | 532 | 360 | 243 | 435 |
| Amount of Ni supported wt % | 1 | 1 | 1 | 1 | 1 | 1 | 1 | 1 | 1 |
| Cracking Percentage wt % | 66.7 | 68.1 | 51.9 | 66.5 | 25.8 | 68.9 | 67.0 | 12.5 | 95.0 |
| Hydrogen/Methane Ratio mol/mol | 3.8 | 4.8 | 13.2 | 20.6 | 8.8 | 25.0 | 17.8 | 5.2 | 7.3 |
| Dry Gas Yield scf/bbl | 99 | 142 | 150 | 408 | 99 | 816 | 352 | 120 | 364 |
| Coke Yield wt % | 3.4 | 3.7 | 2.9 | 6.3 | 2.5 | 15.2 | 6.0 | 3.2 | 8.1 |
| Gasoline Yield wt % | 53.1 | 53.0 | 44.2 | 50.1 | 21.4 | 51.2 | 50.3 | 9.6 | 33.4 |

Reaction conditions were as follows: WHSV 16 $hr^{-1}$, catalyst/oil ratio 3, reaction temperature 482° C. And gas oil from vacuum distillation was used as the starting oil. Before use in the reaction, the catalyst was impregnated with nickel naphthenate according to the Mitchell process [see Ind. Eng. Chem. Prod. Res. Dev., 19, 209 (1980)] to support 1 wt. % of nickel thereon and then subjected to steaming at 770° C. for 6 hours (for attaining, the same condition as equilibrium catalyst). Physical properties of this catalyst and the results of the reaction are as set out in Table 1, in which table the cracking percentage is defined as follows:

$$\text{Cracking percentage} = \frac{\text{Starting oil} - \text{Distillate boiling above 216° C.}}{\text{Starting oil}} \times 100 \text{ (wt. \%)}$$

EXAMPLES 2, 3 and Comparative Examples 1, 2

Catalysts different in the amount of matrix components were prepared and evaluated in the same way as in Example 1, results of which are as shown in Table 1. As can be seen from the table, among catalysts A, B, C, D and E, whose matrices are composed of $Al_2O_3$ and MgO, the catalysts A, B, C and E afford extremely low dry gas (hydrogen, methane, ethylene and ethane) yields and coke yields and exhibit a high resistance to nickel, as compared with the catalyst D having a content of MgO lower than 2 wt. %. But, the catalyst E having an MgO content in the matrix higher than 50 wt. % is low in cracking percentage and is unsatisfactory as a catalytic cracking catalyst.

EXAMPLE 4

(A) Alumina-magnesia matrix slurry was obtained in the following manner. 92 g. of aluminum nitrate and 16 g. of magnesium nitrate were dissolved in 1 liter of pure water. The resultant mixed solution was dropwise added into 4N ammonia water with vigorous stirring so as to give a final pH of 10. The resultant precipitate was recovered by filtration and washed with a sufficient amount of pure water. The total amount of the alumina-magnesia hydrogel thus obtained was charged into a three-necked flask, then pure water and 4N ammonia water were added to adjust the pH to 10 and the total volume to 2 liters. Then, a reflux condenser, a stirrer and a thermometer were attached to the flask, and the hydrogel was aged with stirring (500 rpm) and under heating at 90° C. by a mantle heater for 4 hours, followed by filtration and washing.

2.65 g. of zeolite prepared in the same way as in (B) of Example 1 was slurried by the addition of pure water. The zeolite slurry was kneaded with the total amount of the alumina-magnesia hydrogel slurry prepared in the above (A). After adjusting the viscosity of the gel by the addition of pure water, the mixture was spray-dried and then calcined in air at 500° C. for 4 hours. The composition of the final product is as shown in Table 2.

Then, the activity and selectivity of the catalyst thus obtained were evaluated in accordance with ASTM (D-3907) MAT. Further, in order to check the resistance to nickel of the catalyst, 1 wt. % of nickel was supported on the catalyst according to the Mitchell process. More specifically, the catalyst was impregnated in a solution of nickel naphthenate in toluene and then the solvent was evaporated, followed by calcination in air at 550° C. for 3 hours. The catalyst thus obtained was subjected to steaming at 770° C. for 6 hours (for attaining the same condition in performance as equilibrium catalyst) before subjected to MAT. The results of the test are as shown in Table 2.

EXAMPLES 5-7

Alumina-magnesia hydrogel slurries were prepared in the same way as in (A) of Example 1, and aged at 90° C. with stirring (500 rpm) for 4 hours while adjusting the pH of ageing solutions to 9.2, 11 and 11.7, respectively. Thereafter, catalysts were prepared and evaluated in the same manner as in Example 4. Catalyst compositions and the results of evaluation in MAT are as set out in Table 2.

TABLE 2

| Catalyst | Example 4 J | Example 5 K | Example 6 L | Example 7 M |
|---|---|---|---|---|
| Matrix Composition wt % | 85 | 85 | 85 | 85 |
| $Al_2O_3$ | 83.5 | 83.5 | 83.5 | 83.5 |
| MgO | 16.5 | 16.5 | 16.5 | 16.5 |
| Zeolite Content wt % | 15 | 15 | 15 | 15 |
| Ageing Conditions | | | | |
| With or without stirring | with stirring | with stirring | with stirring | with stirring |
| Revolution (rpm) | 500 | 500 | 500 | 500 |
| pH | 10 | 9.2 | 11 | 11.7 |
| Temperature °C. | 90 | 90 | 90 | 90 |
| Time hr | 4 | 4 | 4 | 4 |
| Cracking Percentage wt % | 64.2 | 47.8 | 56.0 | 52.1 |
| Dry Gas Yield scf/bbl | 160 | 275 | 252 | 218 |
| Coke Yield wt % | 4.1 | 3.6 | 3.8 | 3.2 |
| Gasoline Yield wt % | 50.7 | 39.6 | 45.8 | 43.6 |

EXAMPLE 8

(A) Alumina-magnesia matrix was prepared in the following manner. 92 g. aluminum nitrate and 16 g. of magnesium nitrate were dissolved in 1 liter of pure water. The resultant mixed solution was dropwise added into 4N ammonia water with vigorous stirring so as to give a final pH of 10. The resultant precipitate was recovered by filtration and washed with a sufficient amount of pure water.

Then, ammonia gas was adsorbed on 2.65 g. of zeolite prepared in the same way as in (B) of Example 1, at room temperature for 30 minutes, whereby all of acid points in the zeolite were neutralized by ammonia. The zeolite with ammonia thus pre-adsorbed thereon was slurried by the addition of pure water. The zeolite slurry was kneaded with the total amount of the alumina-magnesia hydrogel prepared in the (A). Then, after adjusting the viscosity of the gel by the addition of pure water, the mixture was spray-dried and then calcined in air at 500° C. for 4 hours. The composition of the final product is as shown in Table 1.

The catalyst thus prepared was determined for activity, selectivity and resistance to nickel in the same manner as in Example 4. The results of MAT are as shown in Table 3.

EXAMPLES 9 and 10

2.65 g. of zeolite prepared in the same way as in (B) of Example 1 was allowed to stand in a saturated vapor of n-butylamine or piperidine at room temperature for 30 minutes. The zeolites with these basic compounds adsorbed thereon were each mixed with an alumina-magnesia matrix prepared in the same way as in Example 8, and catalysts were prepared using the resultant mixtures in the same manner as in Example 8. Evaluation results on the catalysts are as set out in Table 3.

TABLE 3

| Catalyst | Example 8 N | Example 9 O | Example 10 P |
|---|---|---|---|
| Matrix Composition wt % | 85 | 85 | 85 |
| $Al_2O_3$ | 83.5 | 83.5 | 83.5 |
| MgO | 16.5 | 16.5 | 16.5 |
| Zeolite Content wt % | 15 | 15 | 15 |
| Pre-adsorbed Basic Compound | ammonia | n-butylamine | piperidine |
| Cracking Percentage wt % | 39.2 | 50.1 | 54.1 |
| Hydrogen/Methane Ratio mol/mol | 12.7 | 15.9 | 17.8 |
| Dry Gas Yield scf/bbl | 142 | 188 | 222 |
| Coke Yield wt % | 2.1 | 2.6 | 3.0 |
| Gasoline Yield wt % | 33.5 | 43.0 | 44.5 |

EXAMPLES 11-13 and Comparative Examples 7-9

Using 4 kg. each of the catalysts A-C prepared in Example 1-3 and the catalysts, D, F and G prepared in Comparative Examples 1, 3 and 4, catalytic cracking reactions of "Sumatra-light" (residual oil from atmospheric distillation) were carried out under the following conditions by means of a recycle fluid type apparatus : reaction temperature 490° C., regeneration column temperature 630° C., atmospheric pressure, catalyst/oil ratio 7.0, starting oil feed rate 700 ml/hr. Table 4 shows results of the reactions.

TABLE 4

| | Example 11 | Example 12 | Example 13 |
|---|---|---|---|
| Hydrogen/Methane Ratio mol/mol | 3.1 | 3.9 | 5.4 |
| Dry Gas Yield scf/bbl | 131 | 140 | 150 |
| Coke Yield wt % | 12.3 | 13.2 | 10.5 |
| Gasoline Yield vol % | 57.0 | 56.9 | 45.4 |
| Middle Distillate Yield vol % | 18.2 | 18.0 | 20.0 |

What is claimed is:

1. A fluid catalytic cracking process for a distillation residue-containing heavy oil containing not less than 0.5 ppm as a total amount of nickel and vanadium, characterized in that said heavy oil is subjected to a fluid catalytic cracking in the presence of a catalyst, said catalyst comprising 3 to 40 weight percent of a crystalline aluminosilicate zeolite and 60 to 97 weight percent of an alumina-magnesia matrix having a magnesia content of 2 to 50 weight percent.

2. The process of claim 1, wherein said heavy oil is a residual oil in atmospheric distillation, a residual oil in vacuum distillation, a solvent deasphalted oil, a solvent deasphalted asphalt, or a mixture of any of them with a distillate from either atmospheric or vacuum distillation.

* * * * *